United States Patent
Wetzig

(10) Patent No.: US 12,455,207 B2
(45) Date of Patent: Oct. 28, 2025

(54) METHOD FOR DETECTING TEST GAS EXITING A TEST BODY USING AN OPTICAL SENSOR

(71) Applicant: INFICON GMBH, Cologne (DE)

(72) Inventor: Daniel Wetzig, Cologne (DE)

(73) Assignee: Inficon GMBH, Cologne (DE)

( * ) Notice: Subject to any disclaimer, the term of this patent is extended or adjusted under 35 U.S.C. 154(b) by 295 days.

(21) Appl. No.: 18/270,109

(22) PCT Filed: Dec. 29, 2021

(86) PCT No.: PCT/EP2021/087812
§ 371 (c)(1),
(2) Date: Jun. 28, 2023

(87) PCT Pub. No.: WO2022/152564
PCT Pub. Date: Jul. 21, 2022

(65) Prior Publication Data
US 2024/0068901 A1    Feb. 29, 2024

(30) Foreign Application Priority Data
Jan. 12, 2021   (DE) .......................... 102021100405.5

(51) Int. Cl.
*G01M 3/20*    (2006.01)
*G01M 3/00*    (2006.01)

(52) U.S. Cl.
CPC .............. *G01M 3/20* (2013.01); *G01M 3/002* (2013.01)

(58) Field of Classification Search
CPC ........ G01M 3/002; G01M 3/007; G01M 3/04; G01M 3/38
See application file for complete search history.

(56) References Cited

U.S. PATENT DOCUMENTS

| | | | | |
|---|---|---|---|---|
| 4,772,789 A | * | 9/1988 | Maram | G01M 3/38 250/330 |
| 5,001,346 A | * | 3/1991 | Barkhoudarian | G01N 21/3504 250/338.5 |
| 5,523,569 A | * | 6/1996 | Hornfeld | G01M 3/38 250/338.5 |
| 10,031,040 B1 | * | 7/2018 | Smith | G06T 7/0004 |
| 10,739,226 B2 | * | 8/2020 | Zhang | G01N 21/3504 |
| 2013/0050466 A1 | * | 2/2013 | Cetin | G01J 3/42 348/82 |
| 2019/0078966 A1 | * | 3/2019 | Zhang | G01M 3/002 |
| 2019/0340914 A1 | * | 11/2019 | Israelsen | G01M 3/04 |

FOREIGN PATENT DOCUMENTS

WO    WO2022/152564 A1    7/2022

OTHER PUBLICATIONS

German language Written Opinion dated Apr. 21, 2022 for corresponding International Application No. PCT/EP2021/087812.
German Search Report for corresponding German Application No. 10 2021 100 405.5 mailed Oct. 8, 2021.

* cited by examiner

*Primary Examiner* — Nathaniel J Kolb
(74) *Attorney, Agent, or Firm* — MILES & STOCKBRIDGE P.C.; David R. Schaffer

(57) ABSTRACT

A method for detecting a test gas escaping from a leak in a test specimen that uses an optical sensor to measure optical radiation reflected or emitted from the test specimen or its background at different points in time and comparing the measured optical radiation at the different points in time to determine whether a leak exists.

10 Claims, 1 Drawing Sheet

METHOD FOR DETECTING TEST GAS EXITING A TEST BODY USING AN OPTICAL SENSOR

FIELD OF THE INVENTION

The invention relates to a method for detecting test gas escaping from a test specimen.

BACKGROUND

The detection of test gas escaping from a test specimen is used to detect a leak in the test specimen. In particular stationary and particularly large test specimens are not examined in a test chamber, but typically with the aid of a hand-held sniffer probe. The sniffer probe is led by the operator to the test location of the test specimen to be examined. The sniffer probe continuously draws in air via an inlet opening of the sniffer probe. The drawn-in air is directed to a gas detector that can selectively detect the leakage gas. The leakage gas, i.e. the gas escaping from a leak in the test specimen, is typically a known test gas with which the test specimen is filled or which is already present in the test specimen. If test gas escapes from a leak at the test location, the leakage gas in drawn in together with the air of the environment of the test location, so that a gas mixture of air and test gas is directed to the detector. The concentration of the test gas in the drawn-in sniffer gas flow depends on the leakage rate as well as on the size of the continuously drawn-in air flow. The lower the leak rate and the larger the drawn-in air flow, the lower the test gas concentration in the drawn-in gas flow.

Furthermore, it is known to use thermographic infrared cameras to detect gas clouds containing an infrared-active gas, i.e. a gas whose absorption spectrum has infrared wavelengths. This involves that the wavelength range incident on the sensor field of the camera is restricted by an optical filter, with the passband of the filter including the absorption spectrum or an absorption band of the gas to be detected and blocking other wavelength ranges. If the camera is now pointed at a corresponding gas cloud, the radiation components transmitted through the gas cloud appear darker in the range of the infrared absorption spectrum than the radiation reflected from the background. As a result, the gas cloud appears as a darkened area in the image of the infrared camera.

For example, the FLIR GF320 camera is known to subtract the individual pixel amplitudes of successive images, thereby enhancing the representation of movements of a gas cloud.

US 2003/0025081 A describes a method for quantitative presentation of gas emissions using an infrared camera.

Imaging of movements of gas clouds in an infrared image is described in WO 2018/45107 A1, EP 3 392 635 A1 and EP 3 351 916 A1.

SUMMARY

The object of the invention is to provide an improved automated method for detecting test gas escaping from a test specimen.

The method according to the invention is defined by the features of claim 1.

Accordingly, optical radiation reflected or emitted by the test specimen to be examined is first received by an optical sensor, for example a digital sensor or a CCD chip. The sensor is configured to sense at least one wavelength of the optical absorption spectrum of the test gas. Preferably, a test gas having an absorption spectrum in the range of infrared wavelengths is used. The sensor can be designed by suitable optics that detect the at least one wavelength of the absorption spectrum, for example by using a suitable optical filter in the beam path between test specimen and sensor to block out wavelengths outside the absorption spectrum. For example, the passband of such an optical filter may include the absorption spectrum or an absorption band, while the stopband of the filter covers the ranges of the adjacent remaining wavelengths.

This is based on the idea that optical radiation reflected or emitted by the test specimen to be examined is received and evaluated to determine, based on the received radiation spectrum, whether the radiation is transmitted through test gas in order to conclude the presence of test gas.

The optical radiation is received at a first point in time and then also at a second point in time following the first point in time. Two digital images are generated from the optical radiation received at each of the two points in time, the pixels of which have signal amplitudes corresponding to the amplitude of at least one absorption wavelength of the test gas at the location in question. Thus, the image point at a location where there is no test gas has a larger signal amplitude than an image point corresponding to a location with test gas. At locations with test gas, radiation of the absorption wavelength is absorbed, i.e. the amplitude of radiation transmitted through the test gas is less than the amplitude of radiation not transmitted through the test gas. The image points imaging a location with test gas therefore have a lower signal amplitude under homogeneous illumination than image points of a location without test gas.

The characteristic of the invention is that a possible test gas cloud of the test gas escaped from a leak is actively moved between the points in time of capturing the two images. That is, in other words, at the location where a gas leak is present or suspected, and where a test gas cloud is thus present or suspected, a gas shock is emitted, for example, which blows away a possible cloud of test gas. This can be effected as a compressed air pulse or also with the aid of a fan. It is important that the gas with which the test gas cloud is moved is different from the test gas and does not have the same absorption bands as the test gas.

In other words, the location where a gas leak is present or suspected and thus where a test gas cloud is present or suspected is the location where the received optical radiation is reflected or emitted or from which the image section is captured.

According to the invention, the first image is compared with the second image of the reflected and emitted optical radiation, wherein the signal amplitude of the image points of the first and the second image correspond to the amplitude of the at least one absorption wavelength range of the test gas. Here, one or more dynamically successive images are compared with one or more continuously successively captured images.

In doing so, preferably, both the camera and the object are fixed so that the image section of the successively captured images is identical.

According to the invention, a leak is automatically considered detected when at least the difference of the signal amplitude of at least a first image point of the first image and the signal amplitude of at least a second image point of the second image exceeds a threshold value. While in the known methods for thermographic imaging of gas, only images of the gas are captured and illustrated, in the method according to the invention, an automated evaluation of the image point amplitudes is performed to detect a leak. This allows a leak to be detected regardless of the user and distance.

With the method according to the invention, an integral evaluation of the tightness of a test specimen can be effected by summing up the differences of corresponding image points of the first image and the second image. This means that the amplitude of an image point $x_{ij}$ with i=1 ... n and j=1 ... m, wherein n, m are natural numbers, of the first image is subtracted from the amplitude of the image point $\overline{x_{ij}}$ of the second image corresponding to the first image point. To this difference the difference of the amplitudes of another image point, e.g. $x_{i+1,j}$ or $x_{i,j+1}$ of both images is added for several image points. This summation can be done, for example, for all image points within a selected area, or for all image points of the entire image, or for each $n^{th}$ pixel with n as a natural number. If the sum exceeds a certain threshold, a leak is considered detected.

If there is no test gas cloud at the location where the received optical radiation is reflected or transmitted, emitting the gas shock to this location does not cause a test gas cloud to move, so that the amplitudes of the image points of the two images do not show any significant differences. The difference of the image points is then below an appropriate threshold value. However, as soon as a test gas cloud is present at the location, the gas shock causes this cloud to shift, so that the test gas cloud is shown at a different position in the first image than in the second image. After subtracting the amplitudes of the image points of the two images, there are still significant amplitude values above the threshold value due to the shifted test gas cloud. As a result, calculating the difference in image points amplitudes may allow a test gas cloud to be detected.

The amplitude portion resulting from background radiation, background noise, or reflected radiation not reflected by test gas is reduced by subtracting the respective image points, while the amplitude portions of the absorption spectra of those image points corresponding to a location with test gas remain. As soon as the sum of these amplitudes exceeds a certain value, a leak can be considered as automatically detected. Thus, according to the invention, an automatic comparison is made with the respective threshold value. As soon as said threshold value is exceeded, a signal can be generated and/or sent which contains the information "a leak is present".

Alternatively or additionally, an automated localization of a leak in the test specimen can also be performed, namely by forming the difference from the amplitude of at least one first image point $x_{ij}$ of the first image and the amplitude of at least one second image point of the first image, which is different from the first image point. The difference is compared with a threshold value, wherein a leak is considered to be present at the location of the first image point if the difference exceeds a threshold value. Here, the sums of the amplitudes of several image points in a first area of the first image can also be compared with the sums of the amplitudes of the image points in a second area of the first image, which is different from the first area. If the difference of the sums of the amplitudes of the image points from the two areas exceeds a preset threshold value, a leak is considered to be detected at the location of the first area. Also in this case, a signal can be sent and/or generated automatically which contains the information that a leak has been detected or is considered to have been detected.

The test specimen is preferably irradiated with optical radiation whose spectrum includes the absorption spectrum of the test gas. In the case that the absorption spectrum of the test gas is absorption wavelengths in the range of infrared wavelengths, the test specimen is irradiated with infrared radiation.

When performing the method according to the invention, it can be advantageous if the test specimen and/or the location of the measurement on the test specimen is shielded from the external environment, e.g. by protective walls, in such a way that air movements of the external environment are kept away from the test specimen or from the measurement location.

A radiation source whose emission spectrum covers a large part, such as more than 50 nm or more than 100 nm or several 100 nanometers of infrared thermal radiation, i.e. whose emission spectrum is a broadband thermal spectrum, can be used to irradiate the test specimen. Alternatively, the radiation source can be a narrow-band radiation source whose emission spectrum covers only a small part of a few nanometers or up to 50 nm of thermal radiation, such as a laser or an LED.

BRIEF DESCRIPTION OF THE DRAWINGS

In the following, an exemplary embodiment of the invention is explained in more detail with reference to the Figures. In the drawings.

DETAILED DESCRIPTION

Figure 1:
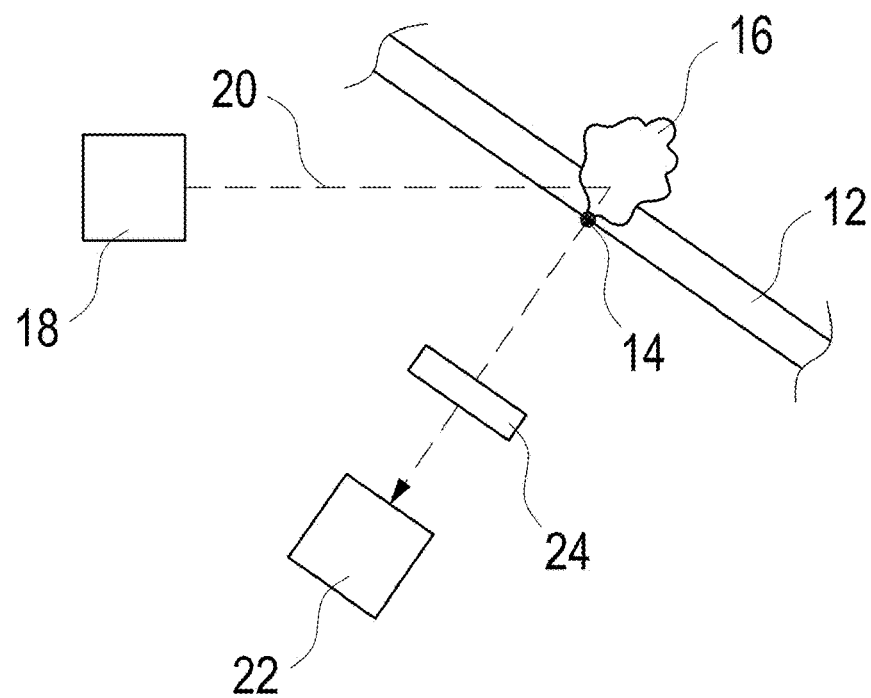
FIG. 1 is a schematic illustration of the exemplary embodiment.

FIG. 1 shows a test specimen 12 in the form of a pipeline that transports a gas or a fluid, e.g. refrigerant, that contains a test gas or can itself be used as a test gas. Test gas 16 flows out through a leak 14 in test specimen 12 and forms a cloud in the area of leak 14.

A radiation source 18 is used to emit infrared radiation 20 toward test specimen 12. Radiation 20 is reflected by test specimen 12 and the background of the test specimen. The reflected radiation 20 is absorbed by a sensor 22 which may be a sensor of a thermal imaging camera, e.g. in the form of a CCD chip. An optical filter 24 is positioned in front of sensor 22 in the beam path of reflected thermal radiation 20.

Figure 2:
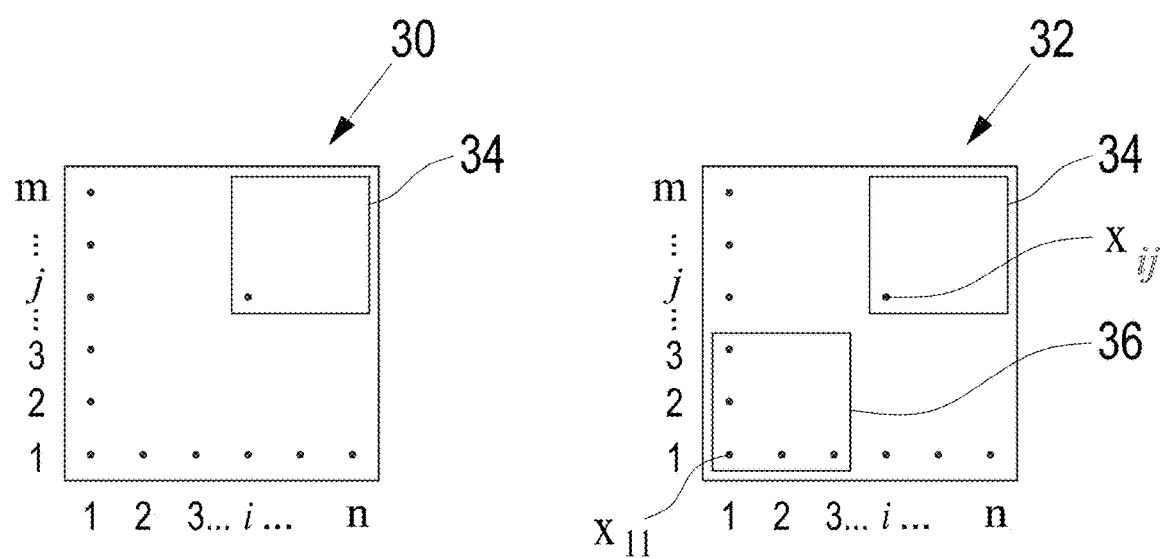
FIG. 2 is a schematic illustration of the captured images.

FIG. 2 shows a first image 30 and a second image 32 of radiation 20 absorbed by sensor 22. Both images 30, 32 have the same number of image points $x_{ij}$, wherein i=1 ... n with n as natural number and j=1 ... m with m as natural number. Each of the two images 30, 32 thus consists of n columns and m rows. When comparing the two images, the image points in a first area 34 of the first image 30 may be compared to the image points in an area 34 of the second image 32 corresponding to the first area 34. Alternatively or additionally, the image points of the first area 34 of one of the images can be compared to the image points of a second area 36 different from the first area 34. This second area can be used for localizing a leak.

In particular, the comparison of the image points $x_{ij}$, $\overline{x_{ij}}$ of the two images 30, 32 can be performed using the term $$\sum_{i,j=1}^{nm} (x_{ij} - \overline{x_{ij}})$$

or using the term $$\sum_{i,j=1}^{n,m} |x_{ij} - \overline{x_{ij}}|.$$

Here $x_{ij}$ is an image point of the first image at the location of column i and row j, while $\overline{x_{ij}}$ is an image point of the second image corresponding to the location of the first image point, i.e. an image point of the second image at the location of column i and row j.

If this term exceeds a certain threshold value, a leak is considered detected. This may generate and/or output a signal indicating that a leak is present or has been detected.

Compared to the prior art, the method according to the invention offers the advantage of an automated leak detection of a test specimen by capturing and evaluating digital images of the test specimen, without leaving the evaluation to a human observer of the captured images. In particular, the method according to the invention or at least the comparison of the captured images and image points and the evaluation of the image points can be computer-controlled or carried out by a microprocessor.

The invention claimed is:

1. A method for detecting a test gas cloud escaping from a leak in a test specimen, comprising the following steps:
   receiving optical radiation reflected or emitted from the test specimen or its background at a first point in time with an optical sensor configured to detect at least one wavelength or a wavelength range of an optical absorption spectrum of the test gas cloud,
   creating a first digital image from the optical radiation received at the first point in time such that signal amplitudes of first digital image points $x_{ij}$ correspond to the amplitude of at least one absorption wavelength range of the test gas cloud,
   receiving optical radiation reflected or emitted from the test specimen or its background at a second point in time by means of the optical sensor,
   emitting a gas shock to move the gas cloud in a direction from which the image section is captured;
   creating a second digital image from the optical radiation received at the second point in time such that the signal amplitudes of second digital image points $\overline{x_{ij}}$ correspond to the amplitude of at least one absorption wavelength range of the test gas cloud,
   comparing the first digital image with at least one second digital image of the reflected optical radiation, which is different from the first image,
   wherein a leak is considered detected when at least the difference of the amplitude of at least a first digital image point $x_{ij}$ of the first digital image and the amplitude of at least a second digital image point $\overline{x_{ij}}$ of the second digital image exceeds a threshold value,
   wherein
   i, j are each natural numbers
   $x_{ij}$ the first digital image point at column i and row j of the first digital image, and
   $\overline{x_{ij}}$ the second digital image point column i and row j of the second digital image.

2. The method according to claim 1, wherein the optical sensor and the test specimen are spatially fixed such that the image sections of the captured images are almost identical.

3. The method according to claim 1, wherein, for integral evaluation of the tightness of the test specimen, the sum is formed from the differences of the amplitudes of mutually corresponding image points $x_{ij}$ of the first digital image and $\overline{x_{ij}}$ of the second digital image, the leak being regarded as detected if the sum exceeds the threshold value.

4. The method according to claim 1, wherein, for localizing the leak in the test specimen, the difference is formed from the amplitude of at least a first digital image point $x_{ij}$ of the first digital image and the amplitude of at least a second image point of the first i digital image, the leak at the location of the i first digital image point $x_{ij}$ being regarded as detected if the difference exceeds a threshold value.

5. The method according to claim 1, wherein the test specimen is irradiated with optical radiation whose spectrum includes at least a part of the absorption spectrum of the test gas cloud.

6. The method according to claim 1, wherein the optical radiation reflected by the test specimen and to be received is filtered with an optical filter whose passband includes at least one absorption wavelength of the optical absorption spectrum of the test gas cloud.

7. The method according to claim 1, wherein during the receiving optical radiation the test specimen is shielded from an external environment in such a way that air movements in the external environment are kept away from the test specimen.

8. The method according to claim 1, wherein the test specimen is irradiated with a radiation source whose emission spectrum covers a large part of infrared thermal radiation, such as a halogen lamp, an incandescent lamp, a radiant heater or a flash lamp.

9. The method according to claim 1, wherein the test specimen is irradiated with a narrow-band radiation source whose emission spectrum covers only a small part of infrared thermal radiation, such as a laser or an LED.

10. The method according to claim 1, wherein the image points $x_{ij}$ of the first digital image and the second digital image are compared with each other using the term $$\sum_{i,j=1}^{n,m} (x_{ij} - \overline{x_{ij}}),$$

wherein
i, j, n, m are each natural numbers,
$x_{ij}$ is the first digital image point at column i and row j of the first digital image, and
$\overline{x_{ij}}$ is the second digital image point at column i and row j of the second digital image.

* * * * *